United States Patent [19]
Badger et al.

[11] Patent Number: 5,886,647
[45] Date of Patent: Mar. 23, 1999

[54] APPARATUS AND METHOD FOR WIRELESS, REMOTE CONTROL OF MULTIPLE DEVICES

[76] Inventors: Berkley C. Badger, 324 Westgate Rd., Tarpon Springs, Fla. 34689; David E. Jones, 630 Drake La. North, Dunedin, Fla. 34698

[21] Appl. No.: 770,428

[22] Filed: Dec. 20, 1996

[51] Int. Cl.⁶ ........................................ H04Q 1/00
[52] U.S. Cl. ............... 340/825.69; 379/103; 340/825.72
[58] Field of Search ................ 340/825.69, 825.72, 340/825.31; 379/102, 103

[56] References Cited

U.S. PATENT DOCUMENTS

| | | | |
|---|---|---|---|
| 3,337,992 | 8/1967 | Tolson | 340/825.69 |
| 3,735,412 | 5/1973 | Kampmeyer . | |
| 3,835,454 | 9/1974 | Palmieri et al. . | |
| 4,355,309 | 10/1982 | Hughey et al. . | |
| 4,454,509 | 6/1984 | Buennagel et al. | 340/825.69 |
| 4,771,283 | 9/1988 | Imoto | 340/825.72 |
| 4,794,268 | 12/1988 | Nakano | 340/825.69 |
| 5,128,987 | 7/1992 | McDonough | 379/102 |
| 5,233,646 | 8/1993 | Kuromi | 379/102 |
| 5,254,908 | 10/1993 | Alt | 340/825.69 |
| 5,307,193 | 4/1994 | VanZeeland | 340/825.69 |
| 5,386,461 | 1/1995 | Gedney . | |
| 5,434,973 | 7/1995 | Lu . | |

Primary Examiner—Brian Zimmerman
Attorney, Agent, or Firm—Terrance L. Siemens

[57] ABSTRACT

A transceiver is used to receive remotely-broadcast, radio frequency (rf) signals at a first frequency. The remotely-broadcast rf signals contain encoded, partial control commands as message packets. Each transceiver is adapted to respond only to signals addressed to it. Upon receipt of an intended rf signal, the transceiver decodes and authenticates the signal. If authenticity is established and the decoded signal is recognized as a proper control signal, a new control message packet is generated using information contained in the incoming message packet and information stored in the memory of the internal micro-controller. The new message packet is broadcast using by a low-power rf transmitter tuned to a different frequency that the frequency of the incoming rf signal. A random delay may be introduced between the receipt of the incoming message and the broadcast of the outgoing message to minimize the probability of correlating the output signal with the input signal. Each controlled device within range of the low-power transmitter then receives the new signal, decodes its contents, and responds appropriately to signals intended for the individual device.

2 Claims, 4 Drawing Sheets

APPARATUS AND METHOD FOR WIRELESS, REMOTE CONTROL OF MULTIPLE DEVICES

BACKGROUND OF THE INVENTION

1. Field of the Invention

This invention relates to the field of remote control and more particularly, to an apparatus and method for remotely controlling a plurality of devices by means of radio frequency signals. The invention includes a number of novel security features to prevent unauthorized usage.

2. Discussion of the Prior Art

The use of radio frequency (rf) signals for the remote control of equipment is well known. For example, most automatic garage door openers employ low-power rf transmitters to open or close the garage door from within an approaching or departing vehicle. Children's remote controlled cars, trucks, boats and airplanes are also popular. However, most remote control systems have very little inherent security since the radio frequency spectrum is open to eavesdropping with both simple and elaborate receivers. Even digitally encoded control messages may be readily intercepted and these same messages may be rebroadcast by an unauthorized "intruder" at will. It is often easy for an intruder to correlate an intercepted digital message with the observation of a controlled activity and then for the intruder to replicate the desired controlled activity at will.

Most remote control devices of the prior art are configured for the control of a single device. If multiple devices must be controlled, multiple remote control channels and associated hardware (i.e., receivers, antennas, etc.) are generally required. The use of multiple rf channels makes the interception task of an intruder relatively simple since individual remote control tasks are more easily correlated with individual, identifiable rf signals. The present invention overcomes this problem by utilizing a single, primary rf channel (i.e., frequency) for the control of multiple devices. A transceiver usually located proximate the device(s) to be controlled receives remote control commands over a primary rf signal. The transceiver, in turn, decodes, authenticates, modifies, and rebroadcasts the remote control commands to individual devices using one or more low-power transmitters. The rebroadcast signal are at a different frequency than the primary rf signal. In addition, random time delays may be introduced before the rebroadcast to further disassociate the rebroadcast signal from the primary signal. Other security features are also included to make the task of interception of control signals extremely difficult.

Many attempts have been made to remotely control multiple devices. U.S. Pat. No. 3,735,412 for Remote Control Systems; issued May 22, 1973 to Roy Kampmeyer, teaches a simple, self-powered rf transmitter and receiver combination for use in a security system. The operating frequency is in the commercial fm band (88–109 MHZ) and the receiver output has only a simple relay contact. The system differs significantly from the system of the present invention. First, no attempt is made to keep the operating frequency secret. No transceiver employing a secondary frequency for rebroadcasting control information is employed. In addition, there is no attempt to encode a digital message packet, or to transmit only partial control information. Finally, unlike the inventive system, the Kampmeyer system is only capable of controlling a single device.

The problem of controlling multiple devices is addressed in U.S. Pat. No. 3,835,454 for Plural Channel Fm Remote Control System; issued Sep. 10, 1974 to Joseph Palmieri, et al. Palmieri, et al. teach a system for remotely controlling multiple servo units by using multiple, discreet transmission frequencies. In contradistinction, the system of the present invention features the use of a single transmission frequency and the encoding of a digital message including both address and control information to allow control of multiple, diverse remote devices. The Palmieri, et al. system controls only a single type of remote device, namely a servo unit. In addition, unlike the inventive system, no security features are disclosed.

U.S. Pat. No. 4,355,309 for Radio Frequency Controlled Light System; issued Oct. 19, 1982 to Robert M. Hughey, et al. teaches a system for the remote control of plural lights. The system operates at a frequency in the 320–360 MHZ range and features a digitally encoded device address. Plural receivers are set to one of several possible address codes so that each receiver responds only to transmissions intended for it. Complete control information is transmitted. The Hughey, et al. system also differs significantly from the inventive system. No transceiver is employed. No secondary, time delayed signal is utilized, and none of the other security features of the instant invention are present.

U.S. Pat. No. 4,454,509 for Apparatus for Addressably Controlling Remote Units; issued Jun. 12, 1984, to James A Buennagel, et al. uses a central message generation site and transmitter to send tone-encoded messages to a plurality of receivers. Upon command, each receiver may connect or disconnect an electrical load from the electrical power distribution network. In contradistinction, the inventive system utilizes a wireless command converter (transceiver) to rebroadcast a digitally encoded message packet on a different frequency. Also, elaborate security precautions at the central control center of the inventive system are missing from the Buennagel, et al. system.

Another attempt to provide remote control of multiple devices is disclosed in Telephone Operated Heating, Ventilating And/or Air Conditioning, the subject of U.S. Pat. No. 5,386,461, issued Jan. 31, 1995 to Richard R. Gedney. Gedney teaches a system for intercepting dual tone multiple frequency (DTMF) signal sent over a regular telephone line. Tones are decoded and utilized to activate a switch to provide on/off control of an electrical load. In an alternate embodiment, Gedney teaches the use of a low-power rf link between the tone decoding apparatus near a telephone line, and a thermostat in a remote location within the building. Specific tone sequences are used to set the thermostat to a desired temperature. The system of the present invention differs in that no telephone line is required for operation. In addition, the inventive system may be used to control a plurality of devices as opposed to the single heating, ventilating, air conditioning (HVAC) device described by Gedney. The inventive system utilizes significantly more secure encoding than is possible with simple, DTMF-based control systems. Also absent from the Gedney system is any provision for the authentication of a control signal. In contradistinction, the present invention features elaborate provisions to insure that only authorized control messages may be issued.

Another telephone-based control system, is described in U.S. Pat. No. 5,434,973 for Microcontroller for Providing Remote Control of Electrical Switches, issued Jul. 18, 1995 to Chao-Cheng Lu. Lu teaches a system for conveniently controlling multiple electrical loads within the confines of an area such as a house. Load switching is initiated at a local keyboard, although activation by means of telephone, cellular telephone, or computer network using conventional DTMF technology is also taught. Unlike the system of the present invention, no security is provided in the Lu system. Neither is the control of the system by means of a rf link (other than the cellular phone line) per se taught. In addition, Lu does not teach the use of a low power, secondary rf transmitter for the control of multiple loads within the structure.

It is, therefor, an object of the present invention to provide a radio frequency-based, remote control system for a plurality of diverse devices.

It is another object of the invention to provide control only from a central location.

It is a further object of the invention to provide a multiplicity of security features to prevent unauthorized control of any of the remotely-controlled devices.

It is still a further object of the invention to utilize wireless command converters (transceivers) which receive a partial or incomplete control message packet on a first frequency, authenticate the message packet and then form a new, complete message packet for re-transmission at a different frequency.

It is an additional object of the invention that the wireless command converter introduce a random time delay between reception of a message packet and rebroadcast of a new, complete message packet.

It is a further object of the invention to occasionally transmits spirrous, dummy control message packets.

SUMMARY OF THE INVENTION

The remote control system of the present invention features a transceiver for receiving remotely-broadcast, radio frequency (rf) signals containing encoded control commands (i.e., message packets). Each transceiver is adapted to respond only to signals intended for it. Upon receipt of an intended rf signal, the transceiver decodes and authenticates the signal. If authenticity is established and the decoded signal is recognized as a proper control signal, a new control message packet is generated using information contained in the incoming message packet and information stored in the internal micro-controller. The new message packet is broadcast by a low-power rf transmitter tuned to a different frequency than the frequency of the incoming rf signal. A random delay may be introduced between the receipt of the incoming message packet and the broadcast of the outgoing message packet to minimize the probability of correlating the output signal with the input signal. Each controlled device within range of the low-power transmitter then receives the re-broadcast signal, decodes its contents, and responds appropriately to signals intended it. A system employing a central control facility and one or more rf broadcast facilities for controlling multiple devices at independent sites is also described.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

Figure 1:
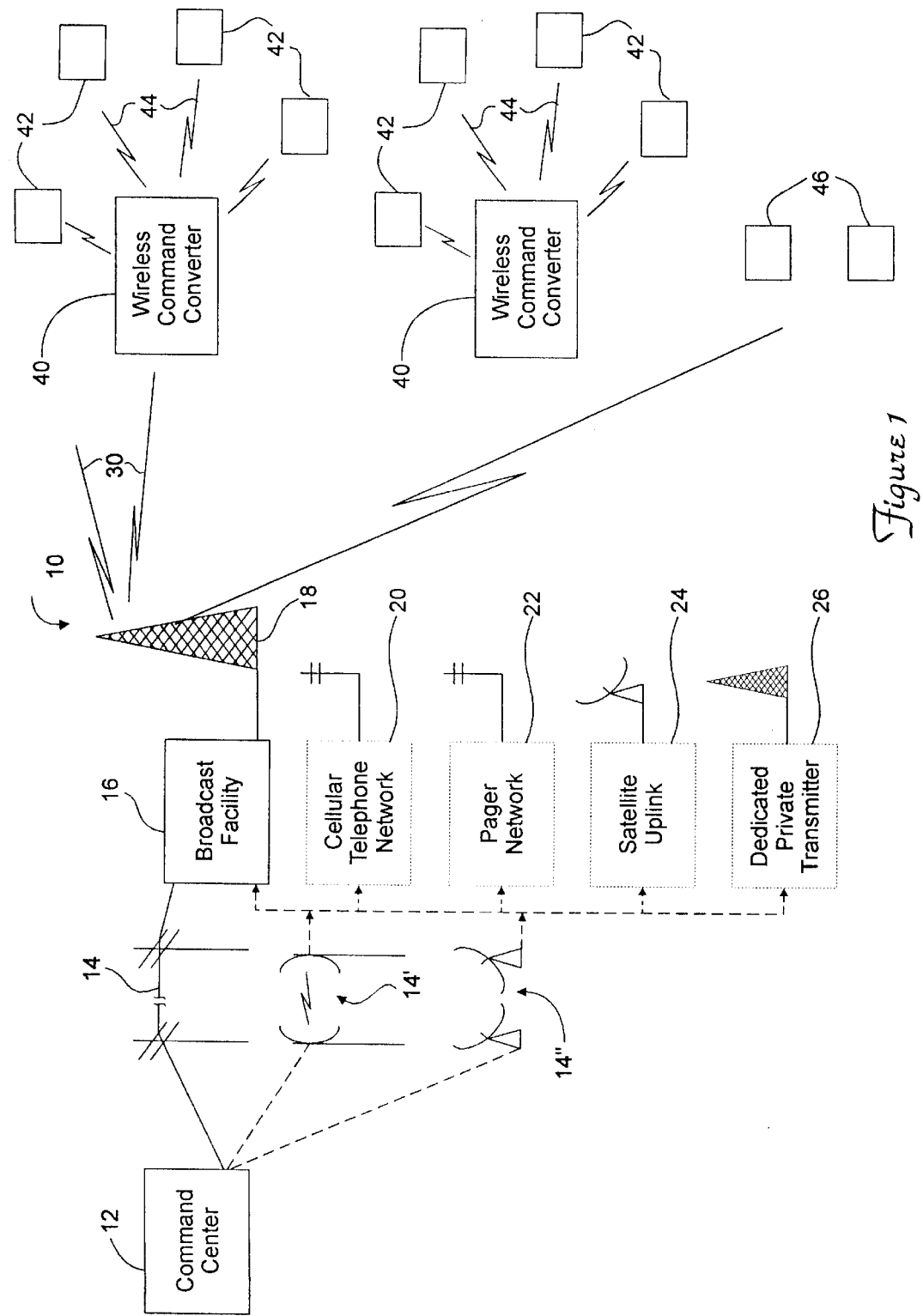
FIG. 1 is a schematic block diagram of the control system of the invention.

Referring first to FIG. 1, there is shown generally at reference number 10, a schematic block diagram of the remote control system of the of the present invention. A central wireless command center 12 generates encoded control messages packets (not shown) which are then broadcast. Typically, the signal containing the encoded control messages is linked to one or more broadcast facilities by a land-line link 14. Alternatively, microwave relay link 14', a satellite uplink, 14" or similar system could be employed to transport the signal containing the control message packets from command center 12 to a broadcast facility 16.

A broadcast facility 16 receives the signal from command center 12, processes the signal, and eventually, modulates a relatively high-power transmitter with the encoded control message packets.

Typically, a sub-carrier on a commercial FM broadcast signal would be employed. The modulated rf signal is then broadcast from a transmission tower 18. In the alternative, the cellular telephone network 20, a commercial pager network 22, or a satellite uplink facility 24 could be used to broadcast an appropriate rf signal. A dedicated transmitter 26 using a frequency allocated for private commercial purposes could also be employed. This alternative potentially provides the highest level of security. In any eventuality, an rf signal 30 containing the encoded control message packets is broadcast.

A plurality of wireless command converter (WCC) transceivers 40 are deployed throughout a geographic area where rf signal 30 may be received. Each WCC 40 is surrounded by devices 42 which are to be remotely controlled. A low-power rf transmitter 90 (FIG. 3) within each WCC 40 broadcasts secondary rf signals 44. Receivers 104 (FIG. 4) in remote control units 100 (FIG. 4), attached to or contained within each device 42, are adapted to respond to rf signals 44. Remote control units 100 only respond to signals addressed to an individual device 42. In addition to devices 42 controlled by WCC 40, individual devices 46 could be adapted for the direct reception of rf signals 30 without the need for the use of WCC 40. This would defeat a major security provision of the system but, nonetheless, it could be done. For purposes of disclosure, transmitter 90 (FIG. 3) has been labeled low-power. It should be obvious to anyone skilled in the art that a high-powered secondary transmitter could be employed giving a greater geographic area within which individual devices 42 could be located without departing from the inventive concept.

Figure 2:
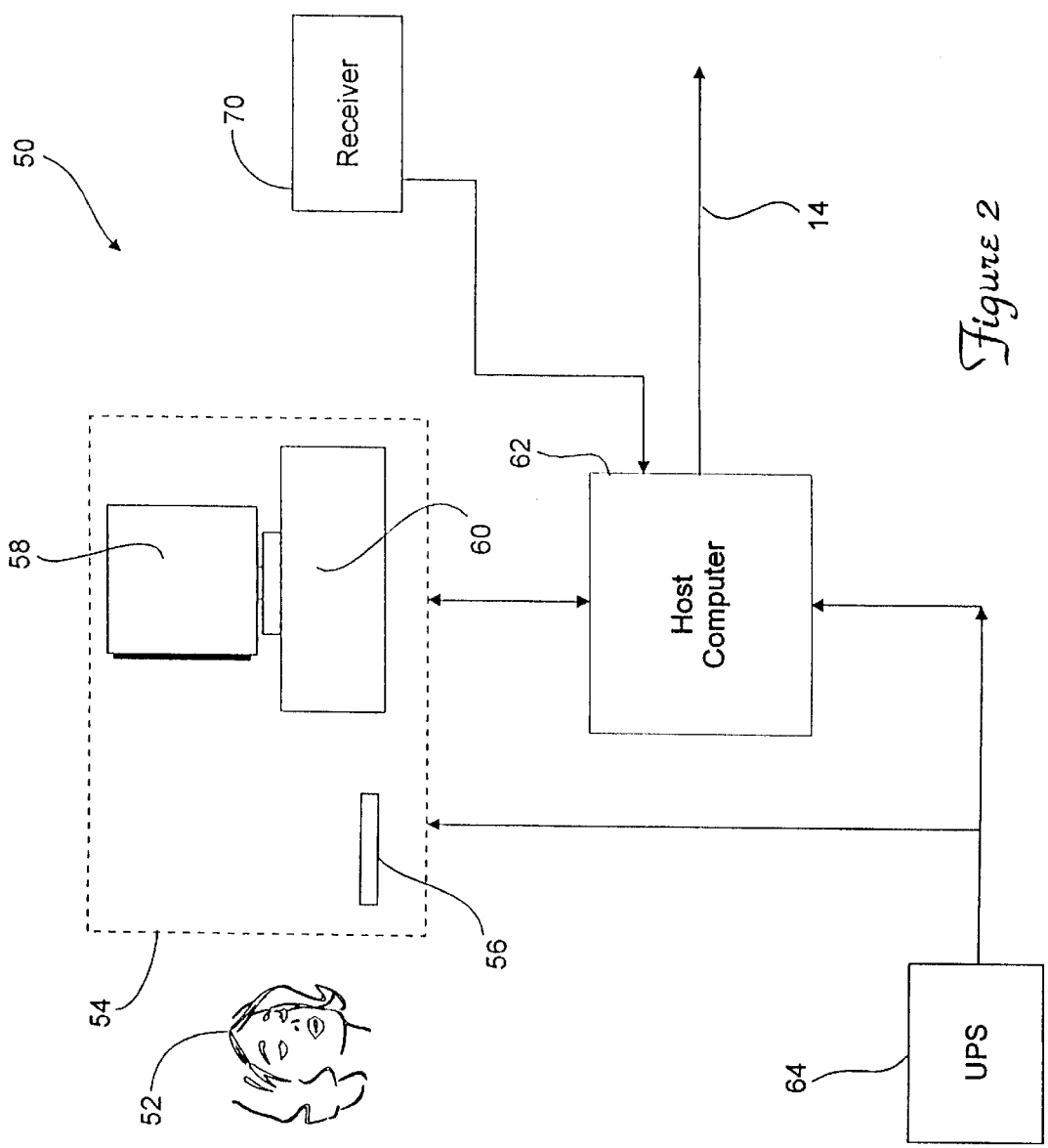
FIG. 2 is a schematic block diagram of the central wireless control facility.

Referring now to FIG. 2, there is shown generally at reference number 50 a schematic block diagram of central command facility 12 (FIG. 1). An operator 52 attends a computer console 54 comprising a keyboard 56 and monitor 58 attached to CPU 60. Console 54 could be implemented using a "dumb" terminal or in a variety of other ways well known in the art. Console 54 is attached via a communications port or local area network (LAN) to host computer 62. Computer 62 could be configured to support virtually any number of consoles 54 although only one has been shown for purposes of disclosure. Both console 54 and host computer 62 are supplied power from an uninterruptible power source (UPS) 64. A wide range of uninterruptible power options such as battery backup and/or gas or diesel-powered generation equipment might be employed to provide continuous power to the central control facility equipment. The host computer 62 communicates any valid command signals to the broadcast facilities 14 for distribution to the (WCC))

units 40. A receiver 70 tuned to the broadcast signal carrier monitors the transmitted signal 30. Receiver 70 is connected to host computer 62 and provides feedback to computer 62 regarding the actual signal broadcast 30.

Operator 52 receives instructions via telephone, facsimile, computer network, or other such communication facility (not shown) regarding control instructions to be issued. Operating procedures require that operator 52 be logged into computer 62 before any control commands may be generated. An operator 52 must be relieved by another operator 52 logging in to the system before the transfer of responsibility of the command center from the retiring operator 52 is given to the new operator 52 for only one operator can be logged into the system at a time. In addition, the identity of anyone requesting operator 52 to issue a command is also carefully ascertained. Systems of identification including passwords, etc. may be employed to minimize the acceptance of remote control requests from anyone except authorized callers.

Figure 3:
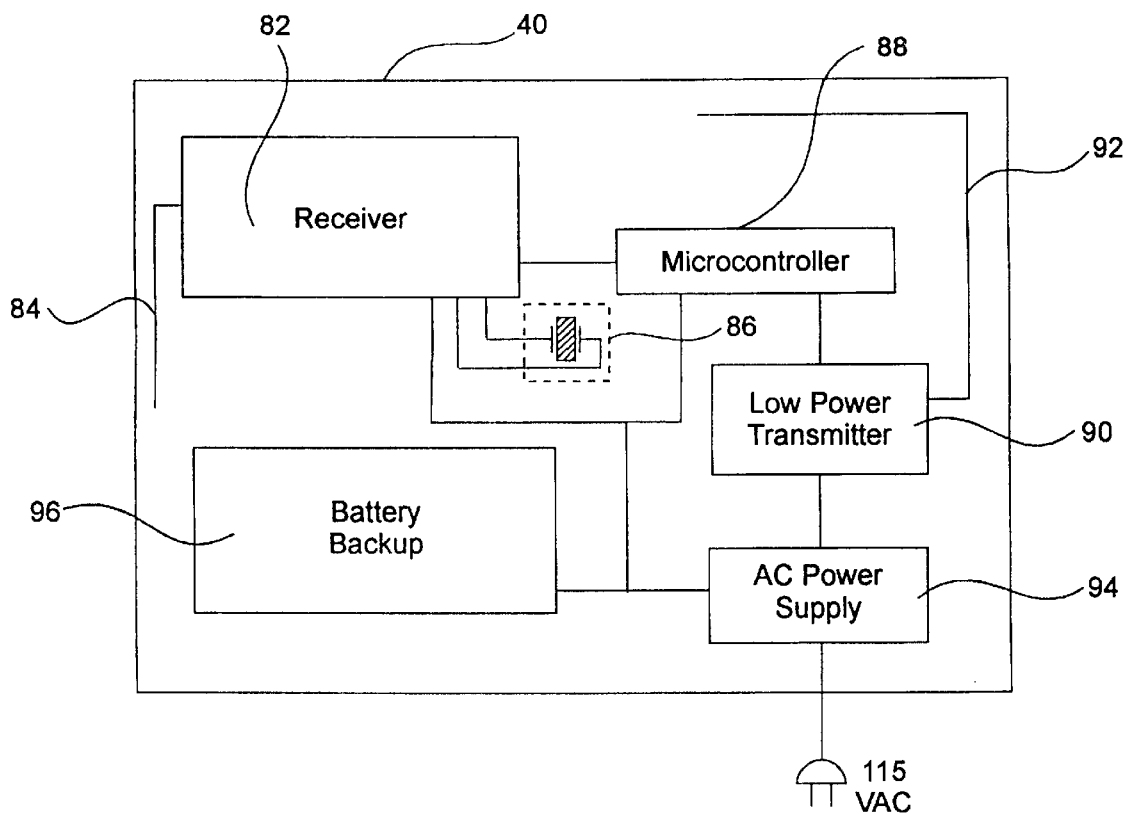
FIG. 3 is a schematic block diagram of the wireless command converter (transceiver) of the invention.

Referring now to FIG. 3 there is shown a schematic block diagram of the wireless command converter (WCC) 40 of the invention. A receiver 82 is turned to the known broadcast frequency of transmitter 16 (FIG. 1). An antenna 84, tuned to the selected broadcast frequency 30, is confined to the interior of WCC 40. This provided physical protection for antenna 84 and also provides a measure of security in that a probable operating frequency range can not be casually surmised from the physical characteristics of antenna 84 by someone attempting to compromise the control system. In some implementations, receiver 82 may have its reception frequency controlled by an optional external crystal 86. The output of receiver 82 is connected to a micro-controller 88 which serves to decode and authenticate commands received from receiver 82. Micro-controller 88 is connected to a low-power transmitter 90. The operating frequency of transmitter 90 does not need to be related in any way the frequency of primary signals broadcast by transmitter 66 (FIG. 2). A transmitting antenna 92 is also fully contained within the housing of WCC 40 for the same reasons as described for receiving antenna 84. All components of WCC 40 are powered from a power supply 94. Power supply 94 is normally connected to a 115 volt ac power source. In addition to powering the circuitry of WCC 40, power supply 94 keeps battery backup 96 at a full charge. In the event of an ac power failure, battery 96 powers WCC 40. The size of battery 96 is chosen for a particular set of operating circumstances such as the probability of a power failure and the criticality of the mission of WCC 40.

Figure 4:
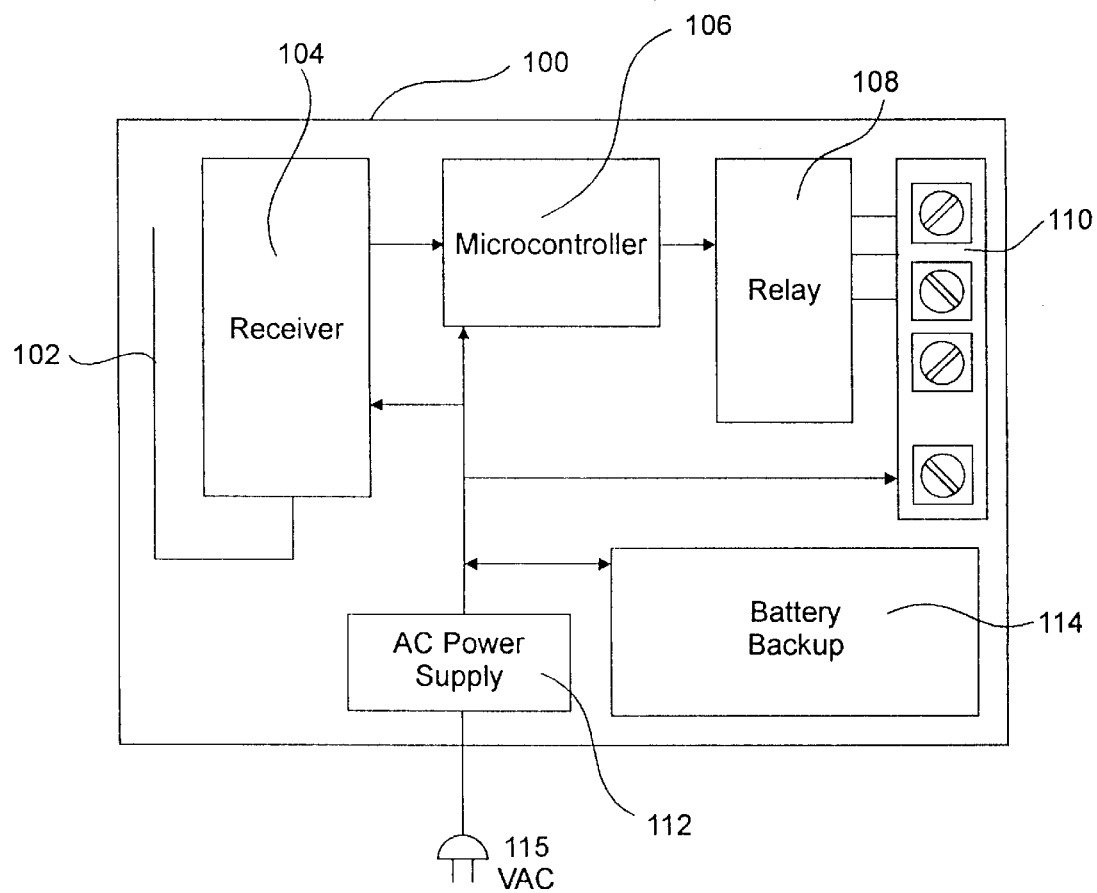
FIG. 4 is a schematic block diagram of a typical remote control receiver for use with the transceiver of the invention.

Referring now to FIG. 4, there is shown a schematic block diagram of a wireless remote control unit (RCU) 100. RCU 100 contains a receiving antenna 102. Antenna 102 is fully contained within the housing of RCU 100 for the same reasons previously enumerated hereinabove. Antenna 102 is tuned to the secondary frequency of broadcast of WCC 40 (FIG. 3). A receiver 104 is connected to antenna 102. Receiver 104 is also turned to the secondary frequency broadcast by WCC 40 (FIG. 3). Micro-controller 106 is connected to the output of receiver 104 and functions to decode and authenticate commands broadcast by WCC 40 (FIG. 3). A switching means 108, typically a relay or latching relay is connected to the output of micro-controller 106. The contact configuration of switching means 108 may be chosen to properly interface to the device (not shown) being controlled. Contacts may appear at a terminal strip 110 or at a connector (not shown) as best serves a particular external device (not shown). RCU 100 is also typically powered from a 115 volt AC line by means of power supply 112. A battery backup 114 may be optionally included if operating circumstances warrant. Power supply 112 also serves as a battery charger for battery 114. While a simple relay has been chosen for purposes of disclosure, it will be obvious to anyone having skill in the art that a wide variety of output devices, well known to those skilled in the art, for providing analog and/or digital outputs could easily be configured.

The operation of the inventive system will now be described. Referring again to FIG. 2, an operator 52 enters the remote command center 12 (FIG. 1). Operator 52 enters a unique identification code into computer console 54. The operator's id is compared to a database of valid operator ids in host computer 62. If the entered operator id is valid (i.e., it is recognized by host computer 62), the operator 52 is allowed to log into the system.

A request for a control action originates outside remote command center 12 and is transmitted to operator 52 by phone, fax, computer network, or other communications means. The request must be validated using any of a variety of techniques well know in the art and forming no part of the present invention. Once operator 52 has validated the request for a control action, a command is entered into console 54 via keyboard 56, a mouse (not shown), a voice recognition unit (not shown), or any other known data entry device or technique. Included in the data entered must be the identification of the device to be controlled and the control action desired. A database (not shown) within host computer 62 is queried. Assuming that a valid device has been identified and a meaningful, legal control action has been requested, host computer 62 assembles a message packet. The message packet is encoded and contains data that is incomplete with regard to ultimately controlling the selected device. That is, even if the message packet were to be intercepted and applied to the selected device, no control action could occur. This is an important security feature of the inventive system.

Referring again also to FIG. 1, The message packet is sent to a broadcast facility 16. Transmission of the message packet may be by dedicated land-line 14, dial-up common carrier line (not shown), microwave link 14', a cellular telephone link (not shown), satellite uplink/downlink 14" or by any other means known to those skilled in the art for the transmission of data from one location to another. It should be noted that a secure communications link is desirable, although not absolutely necessary to overall maintain security of the system. At broadcast facility 16, the message packet modulates an rf carrier 30 at a frequency compatible with the WCC 20 (FIG. 3) associated with the selected device. The rf signal 30 is then broadcast from a transmitting tower 18. In alternate embodiments, any of a number of different transmission strategies may be employed to implement the inventive system. A commercial pager network 22 or a cellular telephone network 20 could be employed to carry the message packet. The message packet could be carried as a sub-carrier on a commercial FM broadcast signal as is also well known in the art. A direct satellite uplink/downlink 26 might also be employed.

Rf signal 30 eventually arrives WCC 40. Referring now also to FIG. 3, rf signal 30 is received at receiving antenna 84 which is completely enclosed within the case of WCC 40. Receiver 82 is tuned to the frequency of rf signal 30. In some embodiments, an optional crystal 86 may be employed to stabilize the receiving frequency of receiver 82. Receiver 82 demodulates rf signal 30 and recovers the message packet. The message packet is passed to micro-controller 88 where it is checked against an embedded address. If the message packet is destined for the particular WCC 40, it is further processed, otherwise, the message packet is ignored. Assuming that the message packet is intended for the particular WCC 40, the message content is further decoded according to a pre-programmed algorithm in micro-controller 88. If the decoded message packet passes any necessary validity tests, a new, output message packet is assembled by micro-controller 88 using a combination of the received message packet and additional information stored within memory (not shown) associated with micro-controller 88. It is important to note that neither the original message packet nor the data within micro-controller 88 is sufficient in and of itself to control the selected device. Only when the original message packet is combined with additional information from within micro-controller 88 is a message packet capable of controlling the selected device formed. This technique forms another important part of the security strategy of the present invention.

An additional security feature, which is implemented in micro-controller 88, is the insertion of a pseudo-random delay between receiving the incoming message packet and transmitting the outgoing message packet. This delay further thwarts any attempt to correlate an incoming rf signal with the outgoing rf signal from the WCC 40 and forms another important component of the security of the inventive system. The output message packet is eventually passed to transmitter 90 where it modulates a new rf signal. The output rf signal is usually at a significantly different frequency than the input signal. Typical operating frequencies could be approximately 900 MHZ for the input frequency and approximately 300 MHZ for the output frequency. Any two frequencies could be chosen to be compatible with particular operating environments and circumstances and the choice of particular frequencies does not form part of the present invention. It is possible that under some circumstances that an identical input and output frequency could be chosen but this would circumvent an important security feature. The rf output signal is applied to transmitting antenna 92. Both antennas 84 and 92 are generally optimized to operate at their respective chosen operating frequencies. Both antennas 84 and 92 are also physically contained within the enclosure of WCC 40 for two important reasons. First, because the physical length of the antennas could provide a clue to the operating frequencies, it is hidden from view. The case also provided physical protection for the antennas. The rf output signal is now broadcast to the remote control units associated with a plurality of devices under the control of the particular WCC 40.

Referring now also to FIG. 4, the output rf signals from WCC 40 arrive at the receiving antenna 102 of remote control unit 100. The signal from antenna 102 is applied to receiver 104 where the received message packet is demodulated. The demodulated message packet is applied to micro-controller 106 where is checked to determine whether or not the transmission is intended for the particular device under the control of the remote control unit 100. If the address component of the incoming message packet matches the address of the remote control unit, micro-controller 106 performs further decoding and verification of the message packet. Finally, a control signal is provided to relay 108 where contacts are opened or closed to provide a controlling signal for an external device. It should be obvious to those skilled in the art that any number of control strategies more sophisticated than the simple contact closure chosen for disclosure could be employed to provide either analog and/or digital control outputs from remote control unit 100. For example, a digital-to-analog converter (DAC) could be utilized to provide a controlled analog signal, if required.

In some operating environments, optical (opto) isolators may prove beneficial and may also be included in wireless remote control unit 100 to protect internal circuitry from externally-generated voltage spikes or other interference.

Since other combinations, modifications and changes varied to fit particular operating requirements and environments will be apparent to those skilled in the art, the invention is not considered limited to the chosen preferred embodiments for purposes of disclosure, but covers all changes and modifications which do not constitute departures from the true spirit and scope of this invention.

Having thus described the invention, what is desired to be protected by Letters Patent is presented in the subsequently appended claims.

What is claimed is:

1. A system for controlling remotely located devices from a central location comprising:

a central control facility for generating a control message indicative of a desired action at a remote location, said control message comprising an encoded, incomplete message packet;

a first broadcast facility for broadcasting said encoded, incomplete message packet on a first frequency;

at least one wireless command converter including memory and also including receiving means for receiving said encoded incomplete message packet and first verification means for verifying the authenticity of said encoded incomplete message packet, said each at least one wireless command converter also including means for decoding said encoded incomplete message packet and generating a final message packet made up of data in said encoded incomplete message packet and data stored in said wireless command converter memory, and where said wireless command converter further includes a second broadcast facility for broadcasting said final message packet on a second frequency, where said second frequency is different than said first frequency, said wireless command converter further including a psuedo-random delay timer means to provide a random time interval between receiving said encoded incomplete message packet and broadcasting said final message packet; and at least one wireless remote control unit adapted to receive said final message packet, including second verification means for verifying the authenticity of said final message packet, and control means for controlling an external device according to data contained in final message packet, said data conforming to the desired action at a remote location initiated at said central control facility.

2. A method for remotely controlling devices, the steps comprising:

receiving a request for a remote action at a central control facility;

verifying the authenticity of said request;

generating an encoded, incomplete message packet indicative of said remote action request;

transmitting said encoded, incomplete message packet at a first frequency;

receiving said encoded incomplete message packet at least one wireless command converter;

verifying the authenticity of said encoded, incomplete message packet;

decoding said encoded incomplete message packet;

generating a final message packet made up of said decoded incomplete message packet and further made up of data stored in memory of said wireless command converter;

waiting for a pseudo-randomly determined period of time;

transmitting said final message packet at a second frequency different from said first frequency;

receiving said final message packet at a wireless remote control unit;

verifying the authenticity of said final message packet;

controlling an external device according to data contained in said final message packet.

* * * * *